United States Patent [19]

Okawa et al.

[11] Patent Number: 4,981,607
[45] Date of Patent: Jan. 1, 1991

[54] LIQUID-CRYSTALLINE ORGANOPOLYSILOXANES AND METHODS FOR THEIR PREPARATION

[75] Inventors: Tadashi Okawa, Chiba, Japan; Toshio Suzuki, East Sussex, United Kingdom

[73] Assignee: Toray Silicone Company Limited, Tokyo, Japan

[21] Appl. No.: 339,562

[22] Filed: Apr. 13, 1989

[30] Foreign Application Priority Data

Apr. 22, 1988 [JP] Japan ................................ 63-99730

[51] Int. Cl.$^5$ .............................................. C09K 19/52
[52] U.S. Cl. ......................... 252/299.01; 252/299.64; 252/299.65; 252/299.66; 252/299.67; 552/505; 350/350 S; 350/330; 427/54.1; 427/58; 427/374.1; 430/20; 524/861; 524/862; 524/864; 528/15; 528/18; 528/26
[58] Field of Search .................. 252/299.01, 299.64, 252/299.65, 299.66, 299.67; 260/397; 524/861, 862, 864; 528/15, 18, 26; 427/54.1, 58, 374.1; 430/20; 350/350 S, 330

[56] References Cited

U.S. PATENT DOCUMENTS

| | | | |
|---|---|---|---|
| 4,358,391 | 11/1982 | Finkelmann et al. | 252/299.01 |
| 4,388,453 | 6/1983 | Finkelmann et al. | 528/15 |
| 4,410,570 | 10/1983 | Kreuzer et al. | 427/374.1 |
| 4,702,558 | 10/1987 | Coles et al. | 350/330 |
| 4,774,028 | 8/1988 | Imai et al. | 260/397.2 |

OTHER PUBLICATIONS

F. A. Gemmell et al., "Effects of Mol. Structure on the Properties of Terminally Cyano-Substituted Side Chain Liquid Crystalline Polysiloxanes", Mol. Cryst. Liq. Cryst., 1985, vol. 122, pp. 205-218.

*Primary Examiner*—John S. Maples
*Assistant Examiner*—Shean C. Wu
*Attorney, Agent, or Firm*—Robert L. McKellar

[57] ABSTRACT

What is disclosed and claimed are organopolysiloxanes having liquid crystalline properties at relatively low temperatures as compared to prior art materials. The organopolysiloxanes have this property by virtue of a unique chemical spacer between the siloxane and the mesogenic groups, which spacers are oxyalkylene groups.

6 Claims, No Drawings

LIQUID-CRYSTALLINE ORGANOPOLYSILOXANES AND METHODS FOR THEIR PREPARATION

The present invention relates to organopolysiloxanes which exhibit liquid crystallinity at relatively low temperatures, that is, in the vicinity of room temperature, and to a method for their preparation.

BACKGROUND OF THE INVENTION

A large number of organic compounds which exhibit liquid crystallinity at certain defined elevated temperature ranges have been proposed. Furthermore, a number of polymers have been proposed which contain groups which contain mesogenic groups in the main chain or side chain and which thus exhibit liquid crystallinity in themselves. Organopolysiloxanes which exhibit liquid crystallinity are disclosed in U.S. Pat. Nos. 4,358,391; 4,410,570; and 4,774,028. Thus, U.S. Pat. No. 4,358,391 describes a straight-chain organopolysiloxane having side chain mesogenic groups, U.S. Pat. Nos. 4,410,570 describes the analogous cyclic polysiloxanes, and 4,774,028 describes the analogous branched organopolysiloxanes.

However, these organopolysiloxanes known from the art generally exhibit liquid crystallinity at high temperatures and, therefore, do not exhibit liquid crystallinity unless subjected to appreciable heating.

Based on a consideration of the problem occurring with prior liquid-crystalline organopolysiloxanes as described above, the present invention takes as its object the introduction of novel organopolysiloxanes which exhibit liquid crystallinity at relatively low temperatures, and in particular in the vicinity of room temperature. A method for their preparation is also disclosed.

SUMMARY OF THE INVENTION

The aforesaid object of the present invention is achieved by means of organopolysiloxanes having the general formula (1)

$$R^2-(SiO-)_m-(SiO-)_n-SiR^2, \quad \text{(A)}$$
with $R^1, R^1, R^2, R^1$ substituents

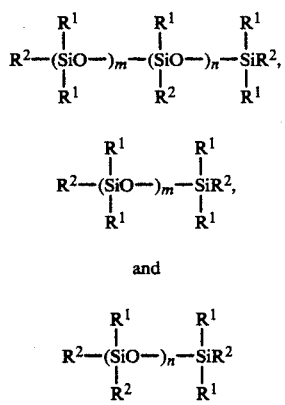

wherein
R$^1$ is a monovalent hydrocarbon group which does not contain an aliphatically unsaturated moiety,
R$^2$ is a group selected from monovalent hydrocarbon groups and groups having the general formula.

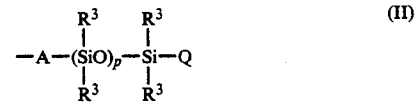

wherein
A is an alkylene group,
Q comprises a mesogenic group bonded to the silicon atom via an oxyalkylene group,
R$^3$ is a monovalent hydrocarbon group which does not contain an aliphatically unsaturated moiety, and
p is an integer having a value of 1 to 20,
m is an integer with a value of 1 to 1000, and
n is an integer with a value of 1 to 1000, with the proviso that in formula (I)A, m+n is an integer with a value of 2 to 1000 and with the further proviso that organopolysiloxane (I) has at least one group (II) in each molecule. Furthermore, the method for the preparation of these organopolysiloxanes can be carried out by means of a method for the preparation of organopolysiloxanes having the following general formula

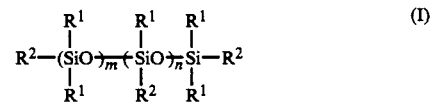

said method compromising
(I) reacting a diorganopolysiloxane having the following general formula:

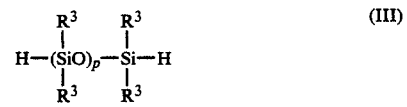

in the presence of a platinum catalyst, with an alkenyloxy group-containing mesogenic compound to give a modified diorganopolysiloxane having a mesogenic group at one terminal end of the diorganopolysiloxane and then,
(II) reacting the modified diorganopolysiloxane, in the presence of a platinum catalyst with a further diorganopolysilo having the following general formula

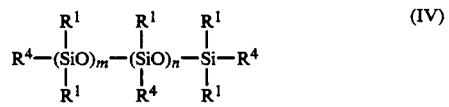

wherein diorganopolysiloxane (IV) has at least one alkenyl group in each molecule, and wherein the alkenyloxy group-containing mesogenic compound and the diorganopolysiloxane (III) are mixed to give a silicon-bonded hydrogen to alkenyl molar ratio of 2 to 10, and wherein
R$^1$, R$^2$, m, n, A, R$^3$, p, and Q have the same meanings as defined in claim 1 and R$^4$ is a monovalent hydrocarbon group.

To explain the preceding in greater detail, the organopolysiloxanes according to the present invention must contain at least one group with general formula (II) in each molecule. Here, R$^1$ is a monovalent organic group which does not contain an aliphatically unsaturated moiety, and examples in this regard are alkyl groups such as methyl, ethyl, propyl, butyl pentyl, and hexyl; aryl groups such as phenyl, tolyl, and xylyl; aralkyl groups such as benzyl and phenethyl; and the 3,3,3-trifluoropropyl group. Other than a group with general formula (II), $R^2$ can be any monovalent hydrocarbon group. Examples here are the groups given above for $R^1$ in addition to alkenyl groups such as vinyl, ally, butenyl, and hexenyl. Other than groups with general formula (II), it is preferred, based on considerations of economics and ease of synthesis, that the silicon-bonded groups in the organopolysiloxanes be methyl; however, it is inconsequential if a portion of $R^2$ comprises unreacted alkenyl groups arising from an excess of alkeny groups in the introduction of the mesogenic group which is described infra.

With regard to the group with the general formula (II) present in the structure of the organopolysiloxanes of the present invention, it is essential that one such group be present in the molecule, it is preferred that this group comprise at least 10 mole% of the total silicon-bonded organic groups in order to develop a superior liquid crystallinity at low temperatures. Furthermore, the $R^3$ present in the structure of the group with general formula (II) is a monovalent hydrocarbon group which does not contain an aliphatically unsaturated moiety. Again, examples are as given for $R^1$ above, and the methyl group is most preferred from an economic standpoint.

Group A in the structure of the group with general formula (II) is an alkylene group, and the group with general formula (II) is bonded through this group to a silicon atom in the main chain of the liquid-crystalline organopolysiloxane. This group A is exemplified by ethylene, gropyene, and butylene, and ethylene is preferred from the standpoint of ease of synthesis and economics.

The diorganopolysiloxane comprising the middle of the group with general formula (II) has a degree of polymerization p of 1 to 20. Not only is there a loss of liquid crystallinity at larger values, but purification during preparation is difficult. Accordingly, values of 1 to 10 are preferred for p.

The group Q comprises a mesogenic group which is bonded to the silicon atom via an oxyalkylene group. The oxyalkylene group comprises groups with the formula

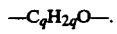

While q preferably has a value of 2 through 20, values of 2 through 12 are even more preferred from the standpoint of ease of synthesis and economics. The mesogenic group bonded to the oxygen atom of this oxyalkylene group comprises those groups known in the art to confer liquid crystallinity, and its structure is not particularly restricted. Examples of these mesogenic groups are phenyl benzoate biphenyl benzoate, biphenyl, benzylideneaniline, azoxybenzene, azobenzene, Schiff base groups, cyclohexyl phenyl ether, cyclohexylbenzene, phenyl cyclohexylcarboxylate, cholesterol, cholestane, and derivatives of the preceding. As is frequently practiced with mesogenic monomers, special effects can be provided, such as dielectric anisotropy, by bonding a polar group, such as an alkoxy group or the nitrile group, in the aforementioned mesogen molecules Furthermore, two or more types of mesogenic groups may be present in a single molecule of the organopolysiloxane, and this often results in a superior liquid crystallinity.

In preferred organopolysiloxanes of the present invention, the mesogenic group comprises an organic group which contains substituted or unsubstituted biphenyl or substituted or unsubstituted aryl benzoate, in either case bonded to the silicon atom via an oxyalkylene group. Furthermore iu the most preferred embodiment, methyl comprises the remainder of the silicon-bonded monovalent hydrocarbon groups. The liquid-crystalline organopolysiloxane according to the present invention has a degree of polymerization (m+n) of 2 to 1,000. A good liquid crystallinity cannot be obtained at higher values. The degree of polymerization is preferably 10 to 100.

The liquid-crystalline organopolysiloxane of the present invention can be prepared by mixing silicon-bonded hydrogen atom end-blocked diorganopolysiloxane having the following general formula

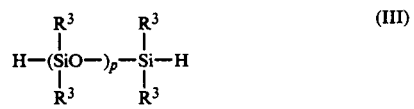

wherein the above structure, $R^3$ is a monovalent hydrocarbon group which does not contain an aliphatically unsaturated moiety, and p is an integer with a value of 1 to 20 with an alkenyloxy group-containing mesogenic compound to give a silicon-bonded hydrogen atom-/alkenyl group molar ratio (SiH/alkenyl) of 2 to 10. These are then reacted in the presence of a platinum catalyst to give diorganopolysiloxanes having a mesogenic group at one terminal and the SiH group at the other terminal. This diorganopolysiloxane is then addition-reacted in the presence of a platinum catalyst with diorganopolysiloxanes having the following general formula

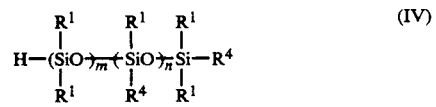

wherein the above structure $R^1$ is a monovalent hydrocarbon group which does not contain an aliphatically unsaturated moiety. $R^4$ is a monovalent hydrocarbon group, m is an integer having a value of 1 to 1,000, and n is an integer with a value of 1 to 1,000, with the provisos that m+n is an integer with a value of 2 to 1,000, and the diorganopolysiloxane with general formula (IV) has at least 1 alkenyl group in each molecule.

Here, $R^1$ retains its definition from above $R^3$ is exemplified as for $R^1$ and $R^4$ is exemplified as for Rwhile also encompassing alkenyl groups such as vinyl, allyl, butenyl and hexenyl. Vinyl is preferred among these. Moreover, diorganopolysiloxane with general formula (IV) must contain at least 1 alkenyl group in each molecule as a group $R^4$.

Considering this method of preparation further, methods for the preparation of the Si-bonded hydrogen atom end-blocked diorganopolysiloxane are in fact known, and further details in this regard are unnecessary. Methods for the preparation of the alkenyloxy group-containing mesogenic compound are also known, for example as disclosed in U.S. Pat. No. 4,358,391. Platinum-type catalysts used in the so-called hydrosilylation reaction are effective as the catalyst to be used in the addition reactions, and preferred examples in this regard are platinum compounds such as chloroplatinic acid and its alcohol solutions, the olefin complexes of platinum and the complexes of platinum and vinyl-containing siloxanes.

While these addition reactions can be conducted in the absence of solvent, they are preferably conducted in the presence of a suitable solvent. Examples of such solvents are aromatics such as benzene, toluene, and xylene; aliphatics such as hexane and heptane; ethers such as tetrahydrofuran and diethyl ether; ketones such as acetone and methyl ethyl ketone; esters such as ethyl acetate and butyl acetate; chlorinated hydrocarbons such as trichloroethane and chloroform; and also dimethylformamide and digethyl sulfoxide. The addition reaction can be run at room temperature, but it will generally be advantageous to run it at temperatures in the range of 50 to 200 degrees Centigrade based on reaction rate considerations.

In the addition reaction between diorganopolysiloxane with general formula (III) and alkenyloxy group-containing mesogenic compounds, particular attention must be given to the ratio at which the two components are introduced in order to carry out a selective reaction with only one terminal of the two terminal silicon-bonded hydrogen atoms in the diorganopolysiloxane. As a consequence, a preferred introduction or charge ratio corresponds to SiH/alkenyl=2 through 10. Values of 2 through 4 are more preferred for economic reasons and ease of removal of the unreacted oligomer.

The charge ratio between the two components is not crucial in the addition reaction to create the modified diorganopolysiloxane using the diorganopolysiloxane having the general formula (IV) and diorganopolysiloxane synthesized as above with a mesogenic group at one terminal and Si-bonded hydrogen at the other terminal. Thus, in an addition reaction with a compound carrying two or more silicon-bonded hydrogen atoms in each molecule, SiH/alkenyl may be less than one when residual alkenyl groups are desired in order ultimately to obtain a liquid-crystalline cured material. On the other hand, SiH/alkenyl must be greater than or equal to one when it is desired that all the alkenyl groups in the diorganopolysiloxane with general formula (IV) be addition-reacted with the diorganopolysiloxane having a mesogenic group at one terminal and a silicon-bonded hydrogen atom at the other terminal. It is preferred that SiH/alkenyl range from 0.5 to 1 for economic reasons and for ease of purification after the reaction.

EXAMPLES

The present invention is explained in greater detail through the illustrative examples given below. Parts=-weight parts in the examples. Also, in the chemical structures, Me=methyl and Vi=vinyl. The liquid crystallinity was observed using a polarization microscope with crossed polarization axes while holding sample temperature on a hot stage. In the examples, the "liquid-crystalline range" was defined by the "temperature marking the boundary between the solid and a fluid liquid crystal" and by the "temperature marking the boundary between the liquid crystal and the isotropic liquid."

REFERENCE EXAMPLE

The following was charged to a four-necked flask and reacted for 4.5 hours at 100 degrees Centigrade: 100 parts tetramethyltetravinylcyclotetrasiloxane, 21 parts dimethylvinylsiloxy-terminated dimethylpolysiloxane (average molecular weight=704), 0.09 parts potassium hydroxide, and 0.17 parts dimethyl sulfoxide. After neutralizing by the addition of 0.2 parts acetic acid and filtration, the low-boiling fraction was stripped by distillation in vacuo, thus affording a transparent polymer. Using gel permeation chromatography (GPC), infrared spectroscopic analysis (IR), nuclear magnetic resonance analysis (NMR), and vinyl group titrimetric analysis by iodometry, it was confirmed that this polymer had the structure with the following average formula.

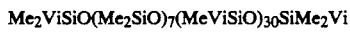

This polymer was designated as SP-1.

EXAMPLE 1

The following was charged to a four-necked flask: 12.6 mmol (4.5 g) diorganopolysiloxane $HMe_2Si(OSiMe_2)_4H$, 6.31 mmol (1.48 g) p,p'-allyloxycyanobiphenyl, 15 mL toluene and platinum/tetramethyldivinylsiloxane complex sufficient to give 30ppm as platinum metal based on the total quantity of diorganopolysiloxane and p,p'-allyloxycyanobiphenyl. After heating under reflux for 5 hours, a sample was analyzed by NMR, and absence of allyl group absorption was confirmed. Removal of the solvent and unreacted diorganopolysiloxane by distillation in vacuo afforded a turbid white liquid. This was confirmed to have the structure with the following formula by IR, NMR, and SiH titrimetric analysis by iodometry. This polymer was designated as SP-2.

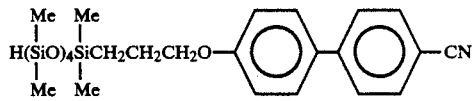

The following Was charged to a four-necked flask 0.41 g (SiVi: 4.0 meq) SP-1, 2.4 g (SiH: 4.0 meq) SP-2, 20 mL toluene, and platinum/tetramethyldivinylsiloxane complex in an amount sufficient to give 140 ppm as platinum metal based on the total quantity of SP-1 and SP-2. After heating under reflux for 17 hours, a sample was taken and investigated by IR: the absorption characteristic of SiH was absent. The solvent was removed by distillation in vacuo to give a pasty white polymer This polymer was analyzed by NMR, which confirmed bonding by addition reaction between the SiVi in SP-1 and the SiH in SP-2. This organopolysiloxane product exhibited liquid crystallinity in the temperature range of 25 degrees Centigrade to 144 degree Centigrade upon only heating.

EXAMPLE 2

The following was charged to a four-necked flask: 12.5 mmol (4.5 g) diorganopolysiloxane $HMe_2Si(OSiMe_2)_4H$, 6.25 mmol (2.07 g) biphenyl p-allyloxybenzoate, 20 mL toluene, and platinum/tetramethyldivinylsiloxane complex sufficient to give 30 ppm as platinum metal based on the total quantity of the diorganopolysiloxane and biphenyl p-allyloxybenzoate. After heating under reflux for 5 hours, a sample was taken and analyzed by NMR, and allyl group absorption was found be absent. The solvent and excess oligomer Were removed by distillation in vacuo to afford a turbid white paste. This was analyzed by IR, NMR, and SiH titrimetric analysis by iodometry, and the following structure was confirmed. This polymer was designated as SP-3.

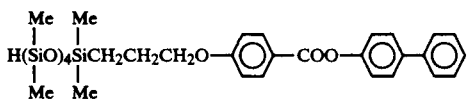

The following was charged to four-necked fails: 0.35 g (SiVi: 3.4 meq) SP-1, 2.3 g (SiH: 3.4 meq) SP-3, 30 mL toluene, and platinum/tetramethyldivinylsiloxane complex sufficient to give 200 ppm as platinum metal based on the total amount of SP-1 and SP-3. After heating under reflux for 13 hours, a sample was taken and analyzed by IR the absorption characteristic of SiH was found to be extinguished. The solvent was removed by distillation in vacuo to give a pasty white polymer. This polymer was analyzed by NMR, and it was confirmed that bonding had occurred by addition reaction between the SiVi in SP-1 and the SiH in SP-3. This organopolysiloxane product exhibited liquid crystallinity in the temperature of 25 degrees Centigrade to 69 degrees Centigrade.

COMPARISON EXAMPLE 1

The following organopolysiloxane was synthesized for the purpose of comparison: it exhibited liquid crystallinity at 128 to 160 degrees Centigrade.

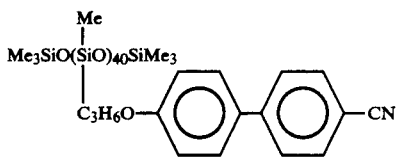

COMPARISON EXAMPLE 2

The following organopolysiloxane was synthesized for the purpose of comparison. It exhibited liquid crystallinity at 145 to 182 degrees Centigrade.

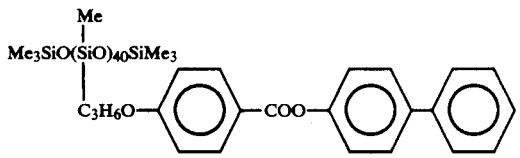

As the Examples and Comparison Examples make clear, because the group conferring liquid crystallinity is bonded via a special substituent, the novel liquid-crystalline organopolysiloxanes of the present invention characteristically exhibit liquid crystallinity at lower temperatures than prior liquid-crystalline organopolysiloxanes, and often exhibit liquid crystallinity even at low temperatures in the vicinity of room temperature. Also, the instant method of preparation provides for a relatively easy preparation through the use of addition reactions. By exploiting these properties, organopolysiloxane according to the invention can be used for the display, indication, recording, and documentation, of visual and optical data and information.

What is claimed is:

1. Organopolysiloxanes selected from the group having the general formula (I)

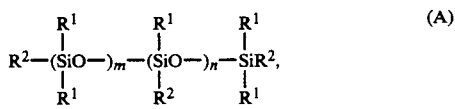

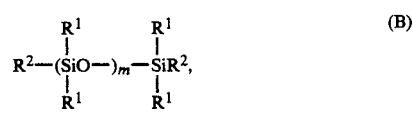

and

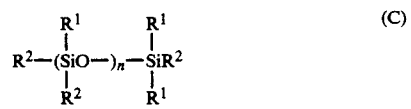

wherein
R$^1$ is a monovalent hydrocarbon group which does not contain an aliphatically unsaturated moiety,
R$^2$ is a group selected from monovalent hydrocarbon groups and groups having the general formula:

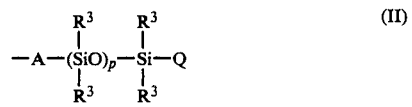

wherein
A is an alkylene group,
Q comprises a mesogenic group bonded to the silicon atom via an oxyalkylene group,
R$^3$ is a monovalent hydrocarbon group which does not contain an aliphatically unsaturated moiety, and
p is an integer having a value of 1 to 20,
m is an integer with a value of 1 to 1000, and
n is an integer with a value of 1 to 1000, with the proviso that in formula (I)A, m+n is an integer with a value of 2 to 1000 and with the further proviso that organopolysiloxane (I) has at least one group (II) in each molecule.

2. An organopolysiloxane as claimed in claim 1 in which Q comprises an organic group which contains substituted or unsubstituted biphenyl.

3. An organopolysiloxane as claimed in claim 1 in which Q comprises an organic group which contains substituted or unsubstituted aryl benzoate.

4. A method for the preparation of organopolysiloxanes as claimed in claim 1 comprising (I) reacting a diorganopolysiloxane having the following general formula:

in the presence of a platinum catalyst, with an alkenyloxy group-containing mesogenic compound to give a modified diorganopolysiloxane having a mesogenic group at one terminal end of the diorganopolysiloxane and then, (II) reacting the modified diorganopolysiloxane, in the presence of a platinum catalyst with a further diorganopolysiloxane having the following general formula

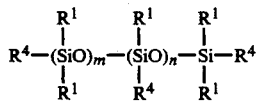

wherein diorganopolysiloxane (IV) has at least one alkenyl group in each molecule, and wherein the alkenyloxy group-containing mesogenic compound and the diorganopolysiloxane (III) are mixed to give a silicon-bonded hydrogen to alkenyl molar ratio of 2 to 10, and wherein $R^1$ is a monovalent hydrocarbon group which does not contain an aliphatically unsaturated moiety, $R^2$ is a group selected from monovalent hydrocarbon groups and groups having the general formula:

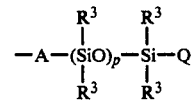

wherein

A is an alkylene group,

Q comprises a mesogenic group bonded to the silicon atom via an oxyalkylene group, $R^3$ is a monovalent hydrocarbon group which does not contain an aliphatically unsaturated moiety, and p is an integer having a value of 1 to 20, m is an integer with a value of 1 to 1000, and n is an integer with a value of 1 to 1000, with the proviso that in formula (I)A, m+n is an integer with a value of 2 to 1000 and $R^4$ is a monovalent hydrocarbon group.

5. A method as claimed in claim 4 in which Q comprises an organic group which contains substituted or unsubstituted biphenyl.

6. A method for the preparation of organopolysiloxanes as claimed in claim 4 in which Q comprises an organic group which contains substituted or unsubstituted aryl benzoate.

* * * * *